United States Patent
Macq et al.

(10) Patent No.: US 6,353,641 B2
(45) Date of Patent: *Mar. 5, 2002

(54) METHOD AND CIRCUIT ARRANGEMENT TO REDUCE A DC-OFFSET

(75) Inventors: Damien Luc François Macq, Louvain-la-Neuve (BE); Pierre Genest, Burty sur Oise (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,008

(22) Filed: Jul. 27, 1998

(30) Foreign Application Priority Data

Jul. 29, 1997 (EP) .............................. 97401820

(51) Int. Cl.⁷ .............................. H04L 25/06
(52) U.S. Cl. ...................................... 375/319
(58) Field of Search ................... 375/316, 319; 341/58

(56) References Cited

U.S. PATENT DOCUMENTS

| 4,873,702 A | | 10/1989 | Chiu | |
|---|---|---|---|---|
| 5,140,699 A | * | 8/1992 | Kozak | 455/84 |
| 5,369,411 A | * | 11/1994 | Lisle, Jr. | 342/194 |
| 5,663,988 A | * | 9/1997 | Neustadt | 375/319 |
| 5,748,681 A | * | 5/1998 | Comino et al. | 375/319 |
| 5,760,629 A | * | 6/1998 | Urabe et al. | 327/307 |
| 5,761,251 A | * | 6/1998 | Wender | 375/345 |
| 5,862,139 A | * | 1/1999 | Yanagi | 370/441 |
| 5,949,829 A | * | 9/1999 | Kawai | 375/334 |

FOREIGN PATENT DOCUMENTS

| EP | 0378450 | 7/1990 |
|---|---|---|
| EP | 0395755 | 11/1990 |
| EP | 0552494 | 7/1995 |
| EP | 0719013 A2 * | 6/1996 |
| EP | 0786915 | 7/1997 |
| GB | 2254523 | 10/1992 |
| WO | 9520864 | 8/1995 |

OTHER PUBLICATIONS

"On the "Personalization" of PCS" by Carl Bedingfield, BellSouth Telecommunications, Proceedings of the Global Telecommunications Conf. San. Francisco, CA Nov. 1994, 707–709.

* cited by examiner

*Primary Examiner*—Tesfaldet Bocure
(74) *Attorney, Agent, or Firm*—Ware, Fressola, Van Der Sluys & Adolphson LLP

(57) ABSTRACT

To reduce the DC-offset in bursts (B1, B2) of a digital signal (S1), some samples of one of the digital bursts (B1) which have no predetermined value are averaged by an averager (AV) resulting in a correction value (CV). Meanwhile the samples of this digital burst (B1) are temporarily stored in a memory (MEM1). The DC-offset correction value (CV) calculated by the averager (AV) is then substracted from the samples of the digital bursts (B1, B2). In this way, the dynamic range of the samples is reduced significantly.

6 Claims, 1 Drawing Sheet

METHOD AND CIRCUIT ARRANGEMENT TO REDUCE A DC-OFFSET

TECHNICAL FILED

The present invention relates to a method to reduce a DC-offset in at least one burst of a first digital signal by subtracting from samples of the at least one burst a correction value obtained by an averaging operation. It is also directed to a circuit arrangement to reduce a DC-offset in at least one burst of a first digital signal, the arrangement including substracting means, adapted to subtract from samples of the at least one burst a correction value; averaging means, adapted to determine the correction value, and having an output coupled to an input of the subtracting means. It is further directed to a and burst mode receiver using such a circuit arrangement.

Such a method to reduce a DC-offset and related equipment are already known in the art, e.g. from the U.S. Pat No. 4,873,702, entitled "Method and Apparatus for DC Restoration in Digital Receivers".

Therein, a method is described for reducing the DC-offset in a digital signal by subtracting a correction value, the so-called offset voltage, from the samples of the digital signal. The offset voltage, as indicated in column 4 of the just cited U.S. Patent from line 15 to line 45, is obtained via an averaging operation. In U.S. Pat. No. 4,873,702 the averaging operation is performed on a preamble signal, i.e. a signal whose samples have predetermined values. A disadvantage of the known method is that transmission of such a preamble signal implies occupancy of bandwidth on the transmission medium between transmitter and receiver. This occupied bandwidth is no longer available for transmission of data. Furthermore, the use of a preamble signal or signal with a fixed predetermined contents for DC-offset purposes requires knowledge of the contents of this preamble signal at the receiver's side. Indeed, the averaged preamble signal contains no information about the DC-offset picked up by a signal transmitted between transmitter and receiver or added to a signal by components in the receiver, for instance a mixer in a radio-receiver. The average of the preamble may differ from zero, even if no DC-offset was applied to the transmitted signal or may be zero even if there is a significant DC-offset. Another disadvantage of the known method is that the receiver has to be well-synchronised to the arrival of the preamble so that only samples of the preamble are averaged.

SUMMARY OF THE INVENTION

An object of the present invention is to provide a method and circuit arrangement to reduce a DC-offset such as the known one, but which have no influence on bandwidth occupancy on the transmission medium between transmitter and receiver, and which do not require knowledge of the contents of a signal received and averaged by the receiver.

According to the present invention, this object is achieved a method to reduce a DC-offset in at least one burst of a first digital signal by subtracting from samples of the at least one burst a correction value obtained by an averaging operation, wherein the correction value is calculated by averaging at least part of samples of a burst of the first digital signal, the samples not having a predetermined value.

The object is also achieved by a circuit arrangement to reduce a DC-offset in at least one burst of a first digital signal, the arrangement including: substracting means, adapted to substract from samples of the at least one burst a correction value; averaging means, adapted to determine the correction value, and having an output coupled to an input of the subtracting means, wherein the arrangement further includes: memory means to an input terminal of which a burst of the first digital signal is applied, and an output terminal of which is coupled to an input terminal of the averaging means, the memory means being adapted to temporarily store the burst and to apply at least part of the samples thereof which have no predetermined value to the averaging means.

This object is still further achieved by a burst-mode receiver used to receive bursts of an analogue radio signal, the burst-mode receiver including: an antenna, adapted to convert the bursts of the analogue radio signal into bursts of an analogue electrical signal; a radio frequency component, coupled to the antenna and adapted to transform the bursts of an analogue electrical signal into bursts of a digital baseband signal; an offset reducing arrangement, coupled to the radio frequency component and adapted to reduce a DC-offset in at least one burst of the digital baseband signal; and a baseband component, coupled to the offset reducing arrangement and adapted to digitally process the bursts of the digital baseband signal; the offset reducing arrangement including: subtracting means, adapted to subtract from samples of the at least one burst of the digital baseband signal a correction value; and averaging means, adapted to determine the correction value, and having an output coupled to an input of the subtracting means, wherein the offset reducing arrangement further includes: memory means to an input terminal of which a burst of the digital baseband signal is applied, and an output terminal of which is coupled to an input terminal of the averaging means, the memory means being adapted to temporarily store the burst and to apply at least part of the samples thereof which have no predetermined value to the averaging means.

In this way, by averaging samples of a data burst which have no predetermined value, a correction value is obtained without transmission of a predetermined sequence of samples or preamble. Precise synchronisation between the averager and the arrival of the data bursts further is not important since any arbitrary sequence of samples of the data burst allows the receiver to calculate a correction value. This correction value is a good DC-offset estimator in any system wherein the average of the transmitted signals is zero. Its quality as DC-offset estimator is less good if the transmitted signals do not have this property.

It is noticed that the DC-offset reducing method from U.S. Pat. No. 4,873,702 includes an additional phase, the so called second step, wherein the offset correction value is updated upon information deduced from the data sent between transmitter and receiver. In this second step, no subsequent data samples are averaged to determine how the offset correction value has to be modified. The second step hence cannot be used to determine an initial offset correction value and can therefore not be regarded as an autonomous offset reducing method. The second step described in U.S. Pat. No. 4,873,702 requires a preceding first step wherein an initial offset reducing correction value is determined. The present invention provides such a method which is advantageous over the known first step method, as explained above.

It is also remarked that a method and circuit, similar to the one known from U.S. Pat. No. 4,873,702 is further known from the European Patent Application EP 92122006.7, entitled 'Method and Circuit Arrangement for Offset Correction in a TDMA Radio Receiver'. The TDMA radio receiver described therein is provided with a circuit which determines a DC-offset correction value by averaging the middle 64 bits of a 142 fixed bits long time interval. Although this circuit doesn't average preamble samples, a person skilled in the art will recognise that the method disclosed in EP 92122006.7 suffers the same drawbacks as that of U.S. Pat. No. 4,873,702.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
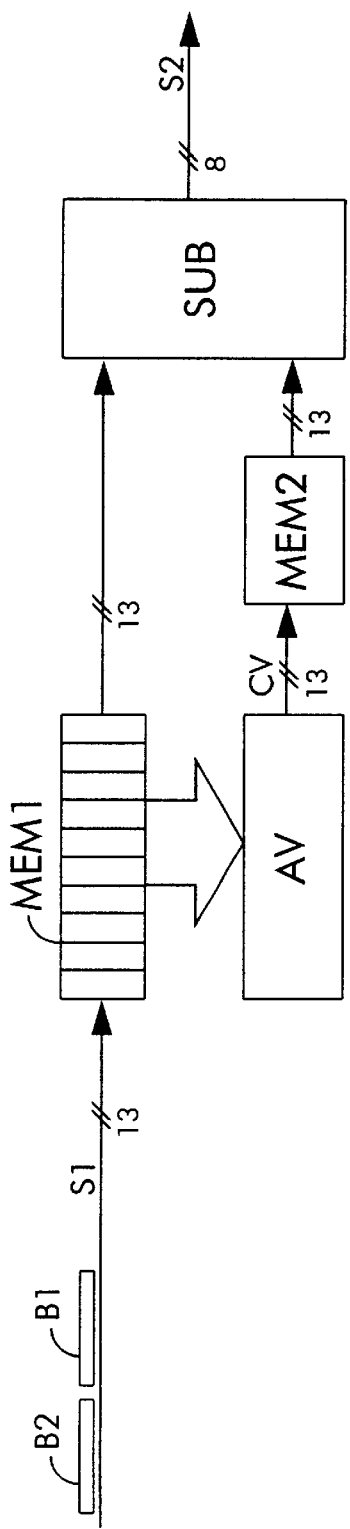
FIG. 1 represents a block scheme of an embodiment of the circuit arrangement to reduce a DC-offset according to the present invention.

The circuit arrangement drawn in FIG. 1 comprises a first memory MEM1, an averager AV, a second memory MEM2, and a subtractor SUB. The first memory MEM1 is coupled between an input line of the circuit arrangement and a first input of the subtractor SUB. An output of the first memory MEM1 further is connected to an input of the averager AV, and an output of the averager AV is coupled to a second input of the subtractor SUB via the second memory MEM2. The subtractor SUB has an output terminal which is connected to an output line of the circuit arrangement.

Via the input line, a first digital signal S1 is applied to the first memory MEM1. This first digital signal S1 consists of subsequent burst B1, B2, two of which are drawn in FIG. 1. The digital samples constituting these bursts B1, B2 each contain 13 bits. The input line of the circuit arrangement in other words can be regarded as a 13-bit wide data bus. In the first memory MEM1, the samples of a single burst are temporarily stored. In FIG. 1, it is supposed that each burst, B1, B2, contains 10 samples. The first memory MEM1 thus consists of 10 memory locations each having a storage capacity of 13 bits.

Whilst the samples of burst B1 are temporarily stored in the first memory MEM1, the averager AV calculates a DC-offset correction value CV. Thereto, the averager AV averages a number of samples of the burst B1 stored in the first memory MEM1. The so obtained DC-offset correction value CV is applied to the second memory MEM2 to be temporarily stored therein. Simultaneously, the samples of burst B1, stored in the first memory MEM1, are applied to the first input of the subtractor SUB. The subtractor SUB than subtracts the calculated DC-offset correction value CV, read from the second memory MEM2, from each sample of burst B1 and applies the result thereof to the output line of the circuit arrangement. On this output line, an offset reduced version of the first digital signal S1 appears. This offset reduced signal is referred to by S2 in FIG. 1.

The average value CV, as well as the burst samples are applied to the subtractor SUB via 13 bit wide data buses. Since the outgoing second digital signal S2 of the circuit arrangement is offset-reduced, its dynamic range is reduced significantly. For this reason, the second output signal S2 is sourced over an 8 bit wide outgoing data bus in FIG. 1.

It is noticed that the calculated correction value CV is stored in the second memory MEM2 and kept unchanged at least for the duration of the burst B1. Otherwise, if the correction value CV would continuously be updated within one burst B1, the operation would become equivalent to a high pass filter. Because the correction value CV doesn't alter within one burst B1, the effect of offset compensation remains applicable even with a very small number of samples (one in the worst case) averaged.

Figure 2:
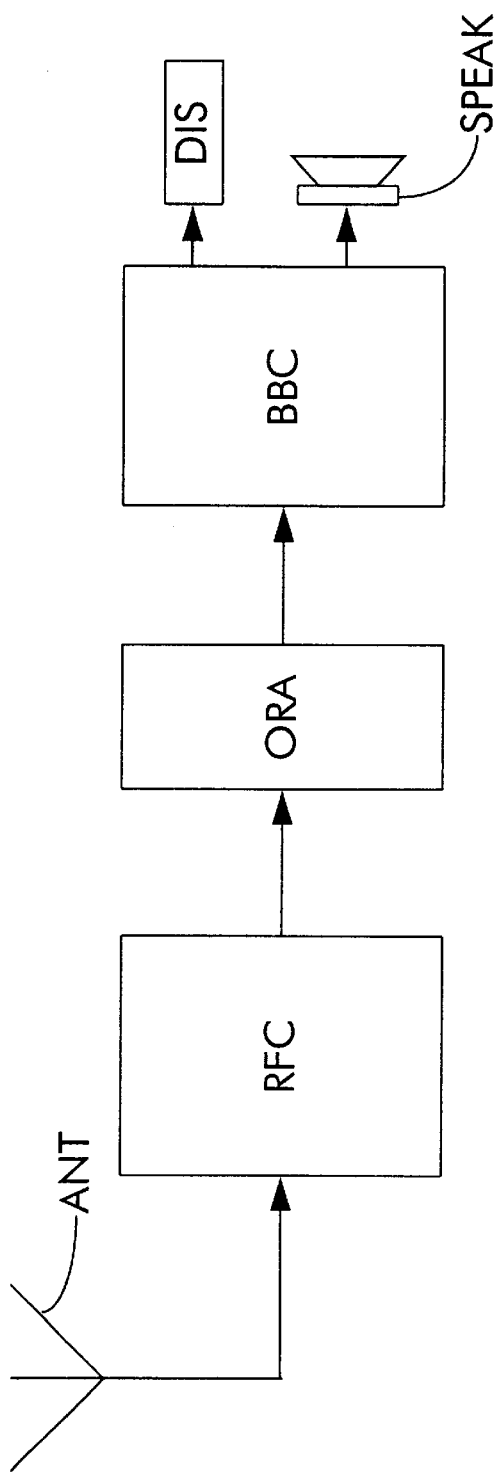
FIG. 2 represents a block scheme of an embodiment of the burst mode receiver according to the present invention.

The burst mode receiver drawn in FIG. 2 comprises an antenna ANT, a radio frequency component RFC, an offset reducing arrangement ORA, a baseband component BBC, a display DIS and a speaker SPEAK. The radio frequency component RFC, the offset reducing arrangement ORA and the baseband component BBC are cascade connected between the antenna ANT and both the display DIS and the speaker SPEAK.

The burst mode receiver receives via its antenna ANT a signal transmitted at a radio frequency of e.g. 900 MHz. When the burst mode receiver is not of the GSM type, but of the DECT type, the DCS type, or when the receiver is a multimode terminal, the radio frequency whereon the signal is received may differ from 900 MHz. The burst mode receiver in FIG. 2 is of the direct conversion type. This means that the radio frequency component RFC converts the received signal from the radio frequency band to the baseband (0 Hz) and not to an intermediate frequency band as would be the case for a burst mode receiver of the superheterodyne type. As a consequence, analogue to digital conversion and digital processing functions such as demodulation are performed in baseband and not at an intermediate frequency. The analogue to digital conversion is performed in the radio frequency component RFC so that the offset reducing arrangement ORA receives a digital baseband signal at its input. Typically, the radio frequency component RFC includes a mixer which performs the conversion from radio frequency band to baseband. Due to leakage, such a mixer transforms parasitic or unwanted signals into a baseband DC component. This so-called baseband DC-offset increases the dynamic range of the baseband signal applied to the offset reducing arrangement ORA significantly. Without offset reduction, all further digital processing in the baseband component BBC would have to be done on wide data samples, for instance 13 bit wide data samples. The offset reducing arrangement ORA, working similarly to the one described above and drawn in FIG. 1, reduces the dynamic range of the digital baseband signal so that samples thereof can be represented with 8 bits instead of 13. The offset reduced samples are then applied to the baseband component BBC which performs digital processing functions such as demodulation, error correction, decoding, and so on. The data are processed so that dedicated parts thereof are applied to the speaker SPEAK which produces audible sounds, and to the display DIS which displays information for the user.

The direct conversion type burst mode receiver is to be preferred instead of a terminal of the superheterodyne type since it allows a higher CMOS integration and it doesn't require the use of discrete filters. In a burst mode receiver of the direct conversion type, the DC-offset however plays an important role since this DC-offset by definition cannot be separated from the signal by filtering. This is so because the signals frequency is concentrated around DC for a baseband signal. According to the present invention, a method is provided to reduce the DC-offset in baseband signals significantly, thus rendering the use of burst mode receivers of the direct conversion type even more attractive.

It is to be remarked that although a burst mode radio receiver was described above, applicability of the present invention is not restricted to any particular transmission medium. It will be obvious to any person skilled in the art of telecommunications that it is of no importance for applicability of the present invention, whether the signal bursts are transmitted over a radio link, a twisted-pair copper line, a coax cable, an optical fibre or even another transmission medium.

Another remark is that the present invention may be applied once upon start-up of the transmission or may be applied separately for each incoming burst. The calculated correction value CV in other words may be subtracted from samples in several subsequent data bursts or may be subtracted only from samples of the burst where it is calculated from. In the latter case, a new DC-offset correction value CV is calculated for each incoming burst. Such a correction value CV obviously takes into account subsequent parameter changes such as thermal drift or the like. Compared to the system wherein the correction value CV is calculated only once, the latter system however requires a higher computational complexity.

Yet another remark is that the present invention is illustrated by the functional block schemes in FIG. 1 and FIG. 2. Each block drawn in these figures is described above by explaining the functions it performs rather than by the electronic components it contains. From the functional description above, any person skilled in the art of designing micro-electronic components can develop detailed electronic circuitry realising these functions. For this reason, no further details with respect to the electronic components of the blocks were given.

While the principles of the invention have been described above in connection with specific apparatus, it is to be clearly understood that this description is made only by way of example and not as a limitation on the scope of the invention, as defined in the appended claims.

What is claimed is:

1. A method to reduce a DC-offset in at least one burst (B1,B2) of a first digital signal (S1) by subtracting (SUB) from samples of said at least one burst (B1,B2) a correction value (CV) obtained by an averaging operation (AV),
   CHARACTERISED IN THAT said correction value (CV) is calculated by averaging at least part of samples of a burst (B1) of said first digital signal (S1), said samples not having a predetermined value, said method involving digital signals only, and said method involving only one averaging operation (AV),
   wherein said at least part of samples is arbitrary and is averaged without knowledge of the contents to be averaged.

2. The method of claim 1, wherein the method is applied once upon start-up of the transmission.

3. The method of claim 1, wherein the method is applied separately for each incoming burst.

4. A circuit arrangement to reduce a DC-offset in at least one burst (B1,B2) of a first digital signal (S1), said arrangement including:

a. subtracting means (SUB), adapted to subtract from samples of said at least one burst (B1,B2) a correction value (CV);
   b. averaging means (AV), adapted to determine said correction value (CV), and having an output coupled to an input of said subtracting means (SUB),
   CHARACTERISED IN THAT said arrangement further includes:
   c. memory means (MEM1) having an input terminal to which a burst (B1) of said first digital signal (S1) is applied, and an output terminal which is coupled to an input terminal of said averaging means (AV), said memory means (MEM1) being adapted to temporarily store said burst (B1) and to apply at least part of the samples thereof which have no predetermined value to said averaging means (AV);
   wherein said circuit arrangement involves digital signals only, and involves only one averaging means (AV).

5. A burst-mode receiver used to receive bursts of an analogue radio signal, said burst-mode receiver including:
   a. an antenna (ANT), adapted to convert said bursts of said analogue radio signal into bursts of an analogue electrical signal;
   b. a radio frequency component (RFC), coupled to said antenna (ANT) and adapted to transform said bursts of an analogue electrical signal into bursts of a digital baseband signal;
   c. an offset reducing arrangement (ORA), coupled to said radio frequency component (RFC) and adapted to reduce a DC-offset in at least one burst of said digital baseband signal; and
   d. a baseband component (BBC), coupled to said offset reducing arrangement (ORA) and adapted to digitally process said bursts of said digital baseband signal; said offset reducing arrangement (ORA) including:
      c1. subtracting means, adapted to subtract from samples of said at least one burst of said digital baseband signal a correction value; and
      c2 averaging means, adapted to determine said correction value, and having an output coupled to an input of said subtracting means,
   CHARACTERISED IN THAT said offset reducing arrangement (ORA) further includes:
      c3. memory means having an input terminal to which a burst of said digital baseband signal is applied, and an output terminal which is coupled to an input terminal of said averaging means, said memory means being adapted to temporarily store said burst and to apply at least part of the samples thereof which have no predetermined value to said averaging means;
   wherein said offset-reducing arrangement involves digital signals only, and involves only one averaging means (AV).

6. The burst-mode receiver of claim 5, wherein the burst mode receiver is of the direct conversion type.

* * * * *